United States Patent

Cha

Patent Number: 5,680,033
Date of Patent: Oct. 21, 1997

[54] SOLAR POWERED WARNING DEVICE

[76] Inventor: Ting-Jen Cha, 5F,No.190,Sec.2,Kee Lung Rd., Taipei, Taiwan

[21] Appl. No.: 709,156

[22] Filed: Sep. 6, 1996

[51] Int. Cl.$^6$ ....................................... H02J 7/00
[52] U.S. Cl. .................. 320/61; 136/244; 136/259; 340/815.4
[58] Field of Search .............. 320/2, 5, 61; 136/244, 136/247, 259, 230, 292, 293; 340/331, 902, 815.4

[56] References Cited

U.S. PATENT DOCUMENTS

| | | | |
|---|---|---|---|
| 4,153,813 | 5/1979 | Blieden et al. | 136/89 PC |
| 4,162,928 | 7/1979 | Sheperd, Jr. | 136/89 PC |
| 4,743,082 | 5/1988 | Mori | 350/96.1 |
| 4,846,151 | 7/1989 | Simko, Jr. | 126/441 |
| 5,453,729 | 9/1995 | Chu | 340/332 |
| 5,537,111 | 7/1996 | Martin et al. | 340/983 |

Primary Examiner—Edward Tso
Attorney, Agent, or Firm—Bacon & Thomas

[57] ABSTRACT

A solar energy powered flashing device includes a light-transmitting, dome-like cover inside which a high efficiency solar energy plate and a circuit board connected to the solar energy plate are received and fixed by a bottom plate attached to the cover. The circuit board has a light emitting diode, a rechargeable cell for driving the light emitting diode and an integrated circuit for controlling the light emitting diode to flash. The cover has a plurality of substantially flat, segmented inside faces, each of which defines a focusing lens with the dome-like outside configuration of the cover for concentrating light and the inside faces have rhombic refractive notches formed thereon. The bottom plate is provided with reflective coatings to reflect light missing the solar energy plate back thereto.

1 Claim, 6 Drawing Sheets

SOLAR POWERED WARNING DEVICE

FIELD OF THE INVENTION

The present invention relates to a device for generating flashing light, which comprises a light-transmitting dome-like cover with a high efficiency solar energy plate and a circuit board encased therein, the cover providing a light concentration configuration to concentrate light incident onto the cover toward the solar energy plate which, together with rhombic refractive notches formed on the inside faces of the cover and light reflective elements disposed on a bottom plate which is fixed to the cover serving to distribute light over the whole solar energy plate, increases the amount of solar energy received by the solar energy plate and enhances the recharging effectiveness of a rechargeable cell that drives the circuit board so as to elongate the time period when the cell is active to supply electricity. Further, the light beam generated by a light emitting diode connected to the circuit board is separated into a plurality of flashing light spots by means of a plurality of light diffusion beads attached to the inside faces of the cover so as to multiply the number of flashing spots and thus provide an economic, efficient and compact flashing device.

BACKGROUND OF THE INVENTION

Devices for generating flashing light are known, such as that illustrated in FIGS. 1 and 2 wherein a flashing device for indicating lanes of road is shown. The conventional flashing device comprises a solar energy plate A1 mounted on the top side of the casing A of the device to receive solar light and generate electrical current to drive a circuit board B disposed inside the casing A. The circuit board B has connected thereto light emitting diodes (LEDs) B2 for light emission and an integrated circuit (IC) B1 for controlling the LEDs B2 to generate flashing light. The circuit board B also comprises a rechargeable cell B3 which is charged by surplus electricity from the solar energy plate A1 for storage of the electricity. The casing A comprises two reflective plates A2 on opposite side walls thereof for reflecting incident light. A plurality of through holes A21 are provided on the reflective side walls A2 of the casing A to allow light beams generated by the LEDs B2 to project outward therethrough and thus provide warning and indication to the approaching cars running along the lane of the road.

In the conventional device, the reflective plates A2 provide reflection to the incoming light beams from the approaching cars and the flashing light is generated through the holes A21 on the reflective plates A2. The spots where flashing light beams are generated are completely determined by the number of the LEDs B2. Thus, to increase the flashing light spots, it has to increase the number of the LEDs This increases the electricity consumption of the whole device which in turn shortens the active period of the cell B3 when the cell B3 is capable to supply electricity. Further, the conventional flashing device can only work when it is in a light intense environment, such as light is substantially perpendicular to the solar energy plate A1. This not only adversely affects the overall recharging effectiveness of the cell B3, but also makes the device have to be placed on light intensive environments or locations in order to properly function.

It is therefore desirable to provide a solar energy powered flashing device which overcomes the above drawbacks of the prior art.

SUMMARY OF THE INVENTION

Therefore, the present invention provides a solar energy powered flashing device comprising a light-transmitting, dome-like cover inside which a high efficiency solar energy plate and a circuit board connected to the solar energy plate are received and fixed by a bottom plate attached to the cover. The circuit board has fixed thereon and connected thereto a light emitting diode for light emission, a rechargeable cell for driving the light emitting diode and an integrated circuit for controlling the light emitting diode to flash. The cover has a plurality of substantially flat, segmented inside faces, each of which defines a focusing lens with the dome-like outside configuration of the cover for concentrating light and the inside faces have rhombic refractive notches formed thereon. When light is incident onto the cover, the cover concentrates the light toward the solar energy plate with the aid of the refractive notches to distribute the light over the whole solar energy plate. This increases the amount of light received by the solar energy plate and provides a better recharging effectiveness of the cell so as to extend the active power supply period of the cell.

Another object of the present invention is to provide a solar energy powered flashing device comprising a plurality of light diffusion beads attached to the inside faces of the cover which separate the light beam generated by the light emitting diode into a plurality of flashing light spots so as to provide multiple flashing spots with one or a few light sources and thus reduce the power consumption.

Another object of the present invention is to provide a solar energy powered flashing device comprising light reflective elements disposed on the bottom plate to capture and reflect light missing the solar energy plate back thereto to increase the amount of light absorbed by the solar energy plate.

The present invention will be better understood from the following description of a preferred embodiment thereof with reference to the attached drawings, wherein:

DETAILED DESCRIPTION OF THE PREFERRED EMBODIMENT

Figure 1:
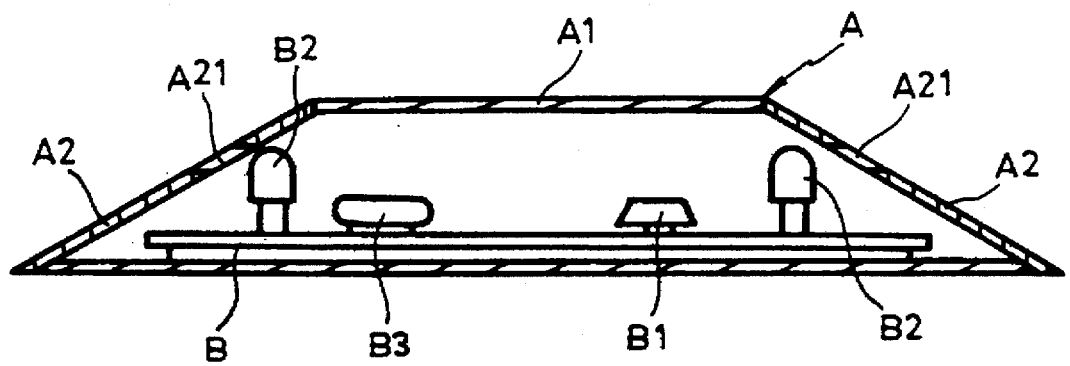
FIG. 1 is a cross-sectional view showing a conventional flashing device which is conventionally used as a road lane indicator.
Figure 2:
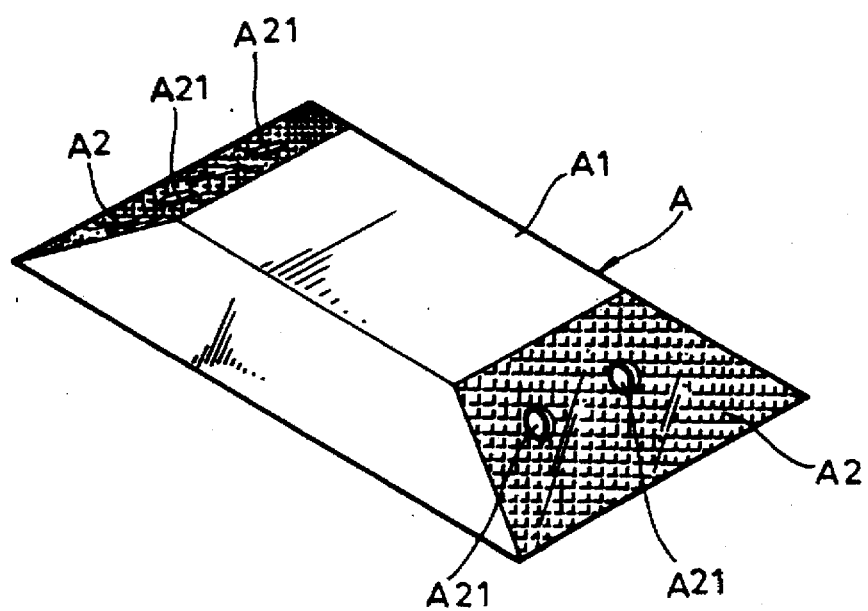
FIG. 2 is a perspective view showing the conventional flashing device.
Figure 3:
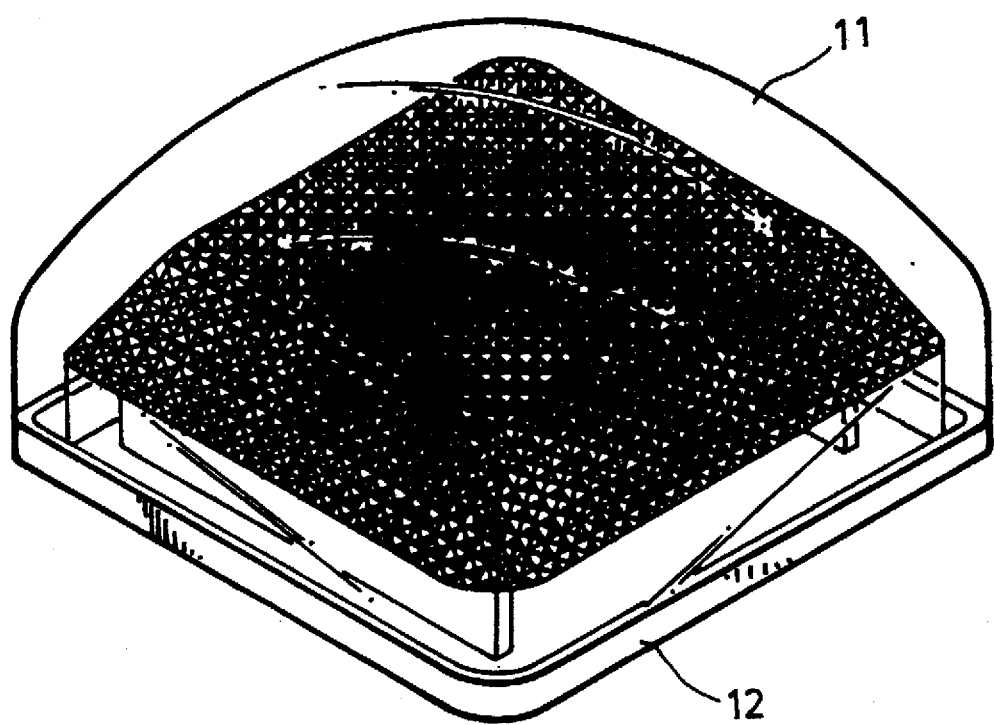
FIG. 3 is a perspective view showing a solar energy powered flashing device constructed in accordance with the present invention.
Figure 4:
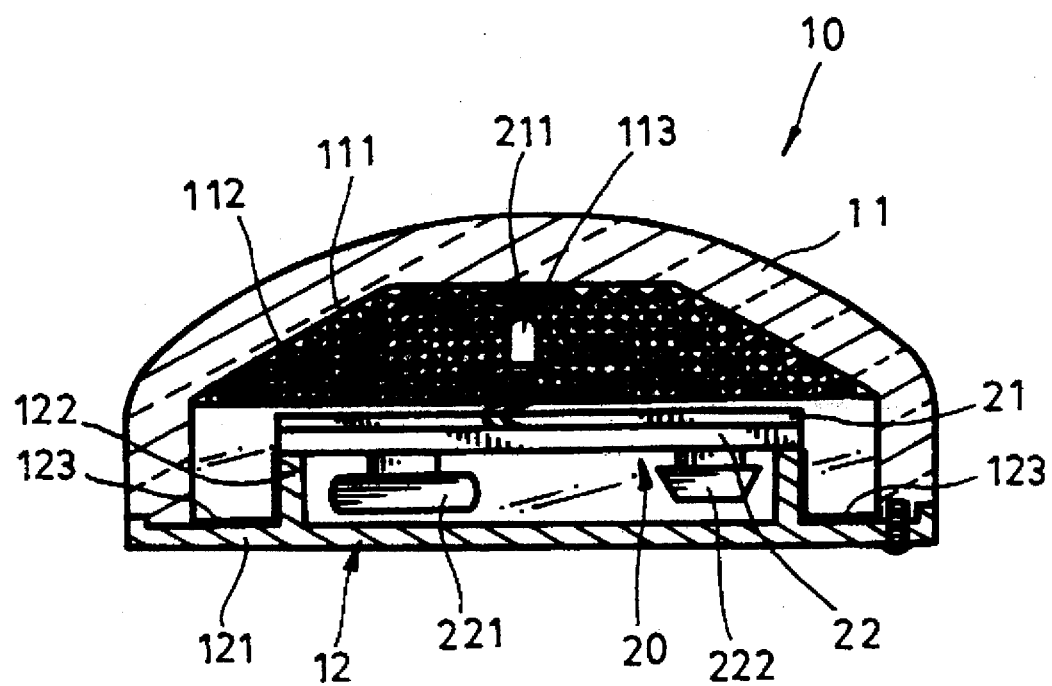
FIG. 4 is a cross-sectional view showing the solar energy powered flashing device of the present invention.
Figure 5:
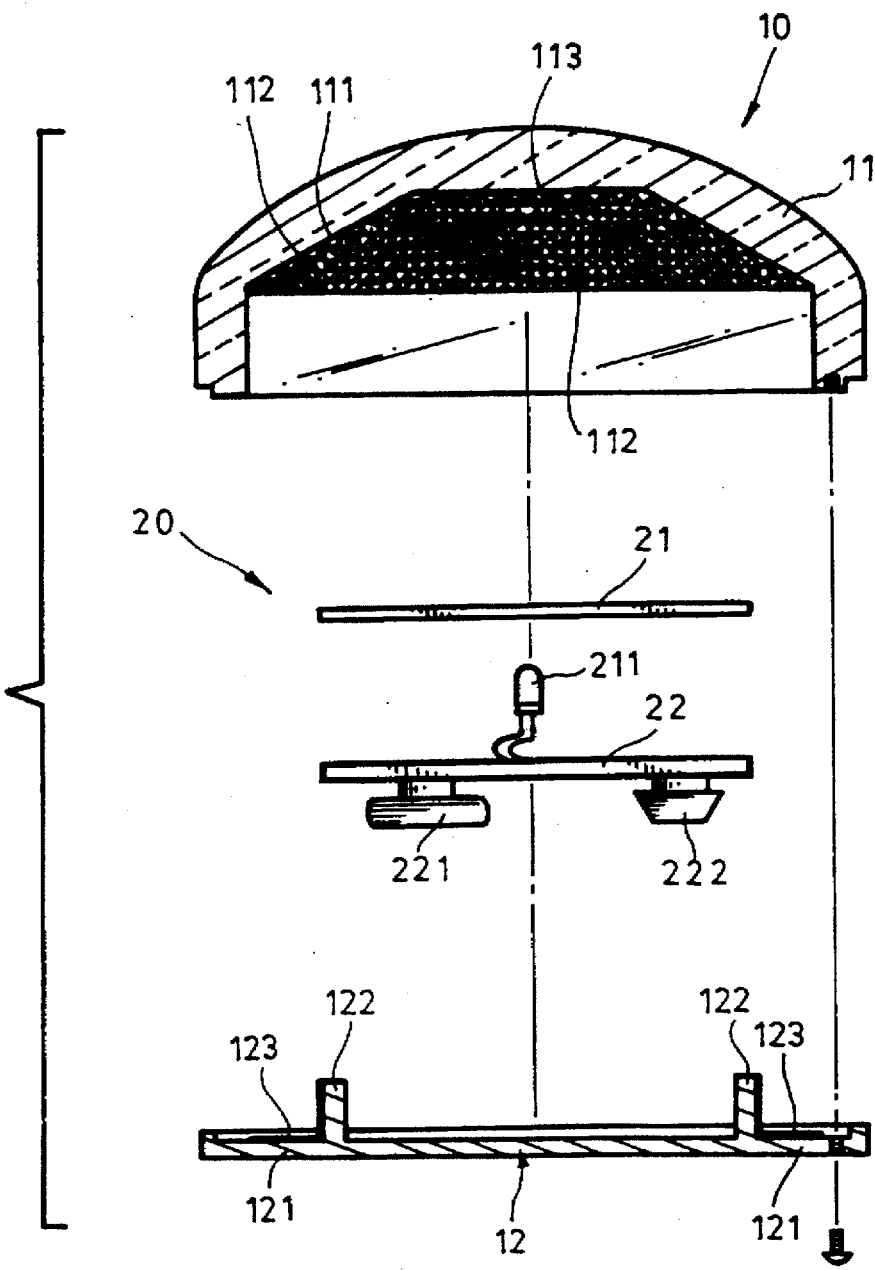
FIG. 5 is an exploded, cross-sectional view of the solar energy powered flashing device of the present invention.

With reference to the drawings and in particular to FIGS. 3 and 4, wherein a solar energy powered flashing device constructed in accordance with the present invention is shown, the flashing device comprises an enclosure casing 10 comprising a light-transmitting cover 11 having an open bottom with a bottom plate 12 fixed thereto to define therebetween an interior space for receiving illuminating means 20 therein. Also referring to FIG. 5, the illuminating means 20 comprises a high efficiency solar energy plate 21 and a circuit board 22 to which an integrated circuit (IC)

222, a rechargeable cell 221 and at least one light emitting diode 211 located above the solar energy plate 21 are electrically connected. The solar energy plate 21 and the circuit board 22 are electrically connected together and disposed under the light-transmitting cover 11 of the casing 10 and secured therein by fixing the bottom plate 12 to the cover 11. The cover 11 is made of a light-transmitting material, such as acrylic resin, to form a dome-like outside configuration, see FIG. 3. The cover 1b has a plurality of substantially flat, segmented inside faces 111. Each of the inside faces 111, together with the dome-like outside configuration, defines a focusing lens structure, serving as a light focusing section of the cover 11 which concentrates solar light incident toward the solar energy plate 21. The inside faces 111 of the cover 11 are provided with rhombic notches 112, serving as light refractive means. A plurality of light diffusion beads 113 are attached to the refractive notches 112.

The bottom plate 12 is provided with upright plates 122 for supporting the circuit board 22 thereon and outward extensions 121 on which light reflective layers or elements 123 are provided.

Figure 6:
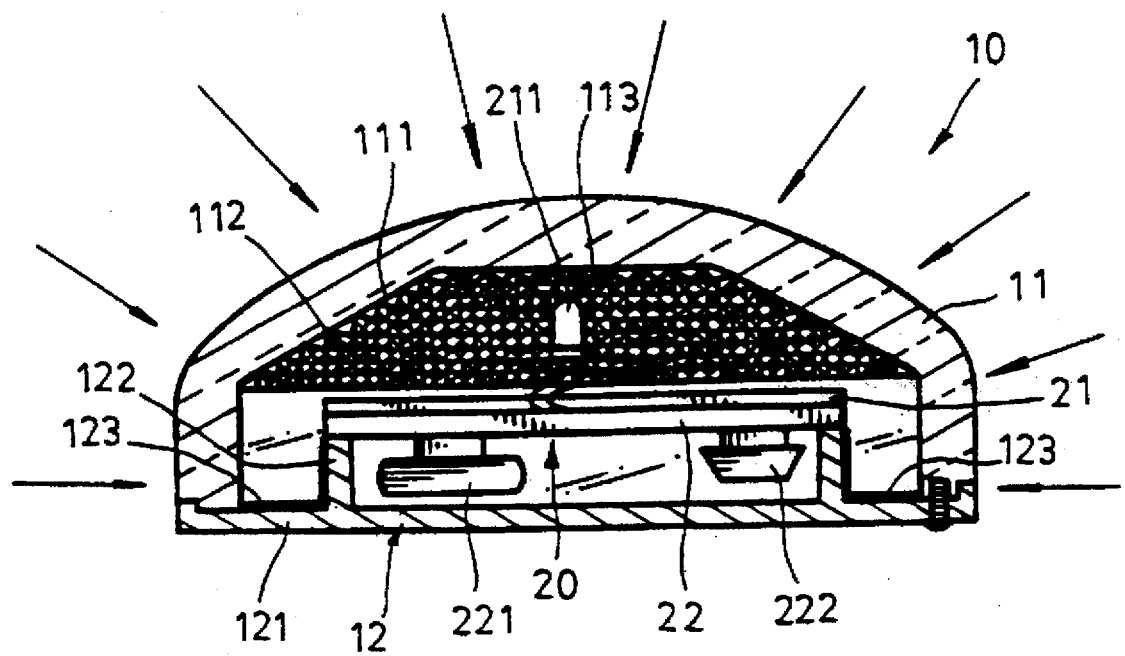
FIGS. 6A and 6B are cross-sectional views showing the operation of the solar energy powered flashing device of the present invention.
Figure 6B:
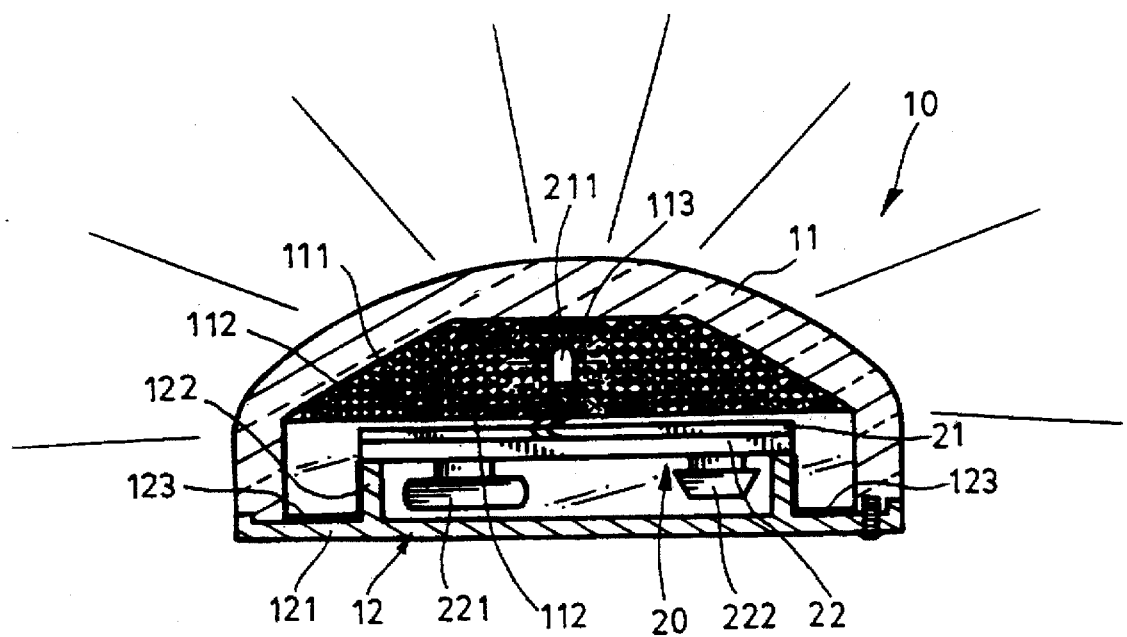

In operation, referring to FIGS. 6A and 6B, when a light beam, such as solar light, is incident upon the cover 11, as shown in FIG. 6A, the light beam passes through the light-transmitting cover 11 and concentrates toward the interior space of the casing 10 by means of the focusing lenses formed by the dome-like outside configuration and the inside faces 111 of the cover 11. The focused light beams then pass through refractive notches 112 and distributed over the whole solar energy plate 21. The light reflective layers 123 on the bottom plate 12 help to reflect light missing the solar energy plate 21 back to the solar energy plate 21 to increase the overall amount of the absorbed incident light.

As shown in FIG. 6B, the light generated by the LED 211 is controlled by the IC 222 to be flashing and the flashing light is separated by the light diffusion beads 113 into several flashing light spots which are projected outward through the refractive notches 112. This allows a single light source, such as the LED 211, to provide a plurality of flashing light spots and thus increases the effectiveness of light flashing in the present inventive flashing device. The cost of parts may thus be reduced.

Further, in accordance with the present invention, the light beam is first concentrated onto the flashing device by the cover 11 and then distributed to the whole solar energy plate 21 through the refractive notches 112 with the aid of the reflective layers 123 to capture the missed light. This allows the illuminating means 20 to be operable even under an environment having weak light intensity, increasing the time that is available to charge the recharge cell and thus the operation efficiency of the flashing device.

This allows the overall size of the flashing device to be reduced. Further, the operability of the flashing device of the present invention in a weak light intensity environment allows the flashing device of the present invention to be placed at places of weak light intensity which was not possible heretofore and thus expands the uses of the flashing device. For example, the flashing device in accordance with the present invention may be used as illuminating devices for advertisement boards and decoration purposes to save electricity consumption or it may be mounted on a buoy, jackets, mountain routes or live-saving constructions and malfunction vehicles for indication or warning purpose. Thus, the present invention provides an economic, efficient and compact flashing device which has a variety of uses.

The present invention provides a flashing device which makes use of the focusing lens structure provided by the cover and the refractive notches provided on the cover, together with the reflective layers, to provide a highly effective solar energy powered flashing device. Further, the present invention allows a single light source to be separated into several light spots to increases the effectiveness thereof. Accordingly, the present invention is a novel design that has never been available heretofore and thus should be granted a patent.

Although a preferred embodiment of the present invention has been described to illustrate the present invention, it is apparent that changes and modifications in the preferred embodiment may be carried out without departing from the scope of the invention which is intended to be limited only by the appended claims.

What is claimed is:

1. A solar powered warning device comprising:

a) a hollow casing including a light transmitting cover and a bottom plate secured to the cover and defining an interior space therebetween;

b) an illuminating means disposed within the interior space and including a high efficiency solar plate, a circuit board, at least one light emitting diode, a rechargeable cell for supplying power to the light emitting diode, and an integrated circuit for controlling flashing of the light emitting diode;

c) the cover including a dome-shaped exterior for receiving incident light therethrough and an interior including a plurality of substantially flat segmented faces for defining a plurality of focusing lenses with the dome-shaped exterior, a plurality of rhombic refractive notches formed on the faces, and a plurality of light diffusion beads attached to the refractive notches; and d) the bottom plate including reflective means for reflecting incident light missing the solar energy plate back thereto and increasing the amount of incident light absorbed by the solar energy plate.

* * * * *